United States Patent
Nguyen

(10) Patent No.: US 7,519,385 B2
(45) Date of Patent: *Apr. 14, 2009

(54) WIRELESS ACCESS POINT (AP) AUTOMATIC CHANNEL SELECTION AND AUTOMATIC POWER ADJUSTMENT

(76) Inventor: Hien Nguyen, 183 W. Main St., Northborough, MA (US) 01532

( * ) Notice: Subject to any disclaimer, the term of this patent is extended or adjusted under 35 U.S.C. 154(b) by 370 days.

This patent is subject to a terminal disclaimer.

(21) Appl. No.: 11/259,865

(22) Filed: Oct. 27, 2005

(65) Prior Publication Data

US 2006/0094370 A1 May 4, 2006

Related U.S. Application Data

(60) Provisional application No. 60/623,745, filed on Oct. 29, 2004.

(51) Int. Cl.
H04B 7/00 (2006.01)
(52) U.S. Cl. ............... 455/522; 455/574; 455/13.4; 455/41.1; 370/328; 370/337
(58) Field of Classification Search .......... 455/522, 455/574, 13.4, 41.1; 370/328, 337, 345
See application file for complete search history.

(56) References Cited

U.S. PATENT DOCUMENTS

| | | | |
|---|---|---|---|
| 6,545,994 B2 * | 4/2003 | Nelson et al. ............... 370/337 |
| 6,711,148 B1 | 3/2004 | Hills | |
| 2001/0033579 A1 * | 10/2001 | Nelson et al. ............... 370/447 |
| 2002/0181417 A1 | 12/2002 | Malhotra et al. | |
| 2003/0158609 A1 * | 8/2003 | Chiu .............. 700/22 |
| 2004/0085896 A1 | 5/2004 | Banerjea et al. | |
| 2004/0141473 A1 | 7/2004 | Buot | |
| 2004/0202130 A1 * | 10/2004 | Backes et al. ............... 370/331 |
| 2004/0203987 A1 * | 10/2004 | Butala ................. 455/522 |
| 2005/0120105 A1 | 6/2005 | Popescu et al. | |
| 2006/0094371 A1 * | 5/2006 | Nguyen ............... 455/67.13 |
| 2007/0225029 A1 * | 9/2007 | Abusch-Magder ........ 455/525 |
| 2007/0253352 A1 * | 11/2007 | Arisha et al. ............ 370/328 |

* cited by examiner

Primary Examiner—Minh D Dao
(74) Attorney, Agent, or Firm—David H. Judson

(57) ABSTRACT

An automatic channel selection (ACS) process enables an access point to determine a best channel available, i.e., the channel with a least amount of interference, for it operation. When ACS is enabled, the access point scans frequencies for all neighboring access points and their signal strengths. Based on this data, the access point then determines which frequency is least likely to be interfered with by these other access points. The access point switches itself to this frequency and begins operation. During normal operation, the access point may periodically rescan the air space and reevaluate its current operating channel. Preferably, every neighboring access point has its own channel, and the co-channel interference levels should be low enough so that there is a maximum coverage and high throughput for the network. If these characteristics cannot be achieved, the access point may then adjust its power automatically to reduce the interference level in the network. This automatic power adjustment (APA) feature preferably operates across a set of access points, each of which has the function. In this manner, the transmitting power of the neighboring access points in the wireless network is "cooperatively" adjusted to minimize the channel interference and maximize the coverage and throughput for the network. A method of determining optimal access point locations for access points that perform the ACS and APA functions is also described.

10 Claims, 10 Drawing Sheets

| Frequency | k=1 | k=2 | k=3 | k=4 | k=5 | k=6 | k=7 | k=8 | k=9 | k=10 | k=11 |
|---|---|---|---|---|---|---|---|---|---|---|---|
| 2.412 GHz | 1.0 | 0.191787 | 0.054403 | 0.000000 | 0.0 | 0.0 | 0.0 | 0.0 | 0.0 | 0.0 | 0.0 |
| 2.417 | .19178 | 1.0 | .054403 | 0.0 | 0.0 | 0.0 | 0.0 | 0.0 | 0.0 | 0.0 | 0.0 |
| 2.422 | 0.054403 | .191787 | 1.0 | .191787 | .054403 | 0.0 | 0.0 | 0.0 | 0.0 | 0.0 | 0.0 |
| 2.427 | 0.0 | .054403 | .191787 | 1.0 | .191787 | .054403 | 0.0 | 0.0 | 0.0 | 0.0 | 0.0 |
| 2.432 | 0.0 | 0.0 | .054403 | .191787 | 1.0 | .191787 | .054403 | 0.0 | 0.0 | 0.0 | 0.0 |
| 2.437 | 0.0 | 0.0 | 0.0 | .054403 | .191787 | 1.0 | .191787 | .054403 | 0.0 | 0.0 | 0.0 |
| 2.442 | 0.0 | 0.0 | 0.0 | 0.0 | .054403 | .191787 | 1.0 | .191787 | .054403 | 0.0 | 0.0 |
| 2.447 | 0.0 | 0.0 | 0.0 | 0.0 | 0.0 | .054403 | .191787 | 1.0 | .191787 | .054403 | 0.0 |
| 2.452 | 0.0 | 0.0 | 0.0 | 0.0 | 0.0 | 0.0 | .054403 | .191787 | 1.0 | .191787 | .054403 |
| 2.457 | 0.0 | 0.0 | 0.0 | 0.0 | 0.0 | 0.0 | 0.0 | .054403 | .191787 | 1.0 | .191787 |
| 2.462 | 0.0 | 0.0 | 0.0 | 0.0 | 0.0 | 0.0 | 0.0 | 0.0 | .054403 | .191787 | 1.0 |
| 2.467 | 0.0 | 0.0 | 0.0 | 0.0 | 0.0 | 0.0 | 0.0 | 0.0 | 0.0 | .054403 | .191787 |

| Channel | Frequency | Cost |
|---|---|---|
| 1 | 2.412 GHz | 1.00000 |
| 2 | 2.417 | .191787 |
| 3 | 2.422 | .054403 |
| 4 | 2.427 | .000001 |
| 5 | 2.432 | .000001 |
| 6 | 2.437 | .000000 (minimal cost) |
| 7 | 2.442 | .000001 |
| 8 | 2.447 | .000001 |
| 9 | 2.452 | .054403 |
| 10 | 2.457 | .191787 |
| 11 | 2.462 | 1.00000 |
| 12 | 2.467 | .191787 |
| 13 | 2.472 | .054403 |

Table 1

Figure 7

| Channel | Frequency | Cost |
|---|---|---|
| 1 | 2.412 GHz | 1.00000 |
| 2 | 2.417 | .383574 |
| 3 | 2.422 | .108805 |
| 4 | 2.427 | .000001 |
| 5 | 2.432 | .000001 |
| 6 | 2.437 | .000000 (minimum cost) |
| 7 | 2.442 | .000001 |
| 8 | 2.447 | .000001 |
| 9 | 2.452 | .054403 |
| 10 | 2.457 | .191787 |
| 11 | 2.462 | 1.00000 |
| 12 | 2.467 | .191787 |
| 13 | 2.472 | .054403 |

Table 2

Figure 10

| Channel | Frequency | Cost |
|---|---|---|
| 1 | 2.412 GHz | 1.00000 |
| 2 | 2.417 | .191788 |
| 3 | 2.422 | .054404 |
| 4 | 2.427 | .054403 (minimal cost) |
| 5 | 2.432 | .191788 |
| 6 | 2.437 | 1.00000 |
| 7 | 2.442 | .246190 |
| 8 | 2.447 | .246190 |
| 9 | 2.452 | 1.00000 |
| 10 | 2.457 | .383574 |
| 11 | 2.462 | 1.00000 |
| 12 | 2.467 | .191788 |
| 13 | 2.472 | .054403 (minimal cost) |

Table 3

Figure 13

| Channel | Frequency | Cost |
|---|---|---|
| 1 | 2.412 GHz | 1.00000 |
| 2 | 2.417 | .383575 |
| 3 | 2.422 | .108807 |
| 4 | 2.427 | .054404 (minimal cost) |
| 5 | 2.432 | .191789 |
| 6 | 2.437 | 1.00000 |
| 7 | 2.442 | .246190 |
| 8 | 2.447 | .437977 |
| 9 | 2.452 | 1.00000 |
| 10 | 2.457 | .671255 |
| 11 | 2.462 | 1.00000 |
| 12 | 2.467 | .287682 |
| 13 | 2.472 | .081605 |

Table 4

WIRELESS ACCESS POINT (AP) AUTOMATIC CHANNEL SELECTION AND AUTOMATIC POWER ADJUSTMENT

This application is based on and claims priority from Provisional Application Ser. No. 60/623,745, filed Oct. 29, 2004.

This application is related to the following commonly-owned applications: U.S. Ser. No. 11/259,866, filed Oct. 27, 2005, titled "Wireless Access Point (AP) Automatic Channel Selection," and U.S. Ser. No. 11/259,864, filed Oct. 27, 2005, titled "Determining Optimal Access Point Locations for Access Points That Perform Automatic Channel Selection and Automatic Power Adjustment."

BACKGROUND OF THE INVENTION

1. Technical Field

The present invention relates generally to creating and managing wireless networks.

2. Background of the Related Art

An access point is a device that acts as a central point between a wireless and a wired network. When multiple access points are installed within close proximity, installers must choose proper radio channels to minimize inter-access point interference, which can degrade the performance of a wireless LAN. Access point devices that include automatic channel selection are known in the art. The access point senses the presence of other access points and attempts to adjust to a quieter channel.

Wireless LAN technologies operate according to a family of IEEE specifications known as 802.11. In particular, the basic 802.11 standard specifies an over-the-air interface between a wireless client and a base station or between two wireless clients. 802.11a is an extension to 802.11 that applies to wireless LANs and provides up to 54 Mbps in the 5 GHz band. 802.11b is an extension to 802.11 that applies to wireless LANs and provides 11 Mbps transmission (with a fallback to 5.5, 2 and 1 Mbps) in the 2.4 GHz band. In 802.11b, the frequency band is 2.4 GHz to 2.4835 GHz. The first channel (Channel 1) is placed at center frequency 2.412 GHz, and subsequent channels are at 5 MHz multiple from the first channel (except channel 14, which is not a multiple of 5 MHz). This arrangement gives a total of 14 channels. In the United States, only channels 1 through 11 are allowed by the FCC. Channel 10 is allowed by all (world) regulatory authorities, and most manufacturers use this channel as the access point default channel. In the United States, the 802.11a channels are channels: 52, 56, 60, 64, 149, 153, 157, 161, and 165. These channels are separated by at least 20 MHz. This is also true for 802.11a channels in other parts of the world.

There are two possible modes of operation for an access point: 802.11b/g channel mode, and 802.11a channel mode. The signal interferences in these 802.11 modes are much different from each other, primarily because of differences in channel spacing and radar signal presence or lack thereof. In 802.11a mode, the channels are spaced far apart from each other; therefore, there is little co-channel interference. As noted above, the spacing between two adjacent channels is 20 MHz. FIG. 1 shows a transmit spectrum mask where a transmit signal's frequency beyond 22 MHz off center is −50 dBr (meaning that its power is reduced by 100,000). Because of this characteristic, finding a radar free channel that has a least amount of intra-channel interference is a problem in 802.11a. Note, however, that 802.11a avoids interference from cordless phones and microwaves because these devices operate in the 2.4 GHz frequency range. In 802.11b mode, as also illustrated in FIG. 1, the channels are only 5 Mhz apart; as a result, there is a strong possibility of adjacent channel interference. To achieve non-overlapping channels in 802.11b, channels 1, 6 and 11 are often used to provide the necessary 20 MHz separation.

In practice, however, access points may be configured to operate on any channel. It would be desirable to provide automatic channel selection algorithms that are not dependent on given assumptions, such as that all access points belong to certain channels, or that otherwise takes into account that all channels are likely to be used by neighboring access points.

The present invention addresses this need in the art.

BRIEF SUMMARY OF THE INVENTION

An automatic channel selection (ACS) process enables an access point to determine a best channel available, i.e., the channel with a least amount of interference, for it operation. When ACS is enabled, the access point scans frequencies for all neighboring access points and their signal strengths. Based on this data, the access point then determines which frequency is least likely to be interfered with by these other access points. The access point switches itself to this frequency and begins operation. During normal operation, the access point may periodically rescan the air space and reevaluate its current operating channel. Preferably, every neighboring access point has its own channel, and the co-channel interference levels should be low enough so that there is a maximum coverage and high throughput for the network. If these characteristics cannot be achieved, the access point may then adjust its power automatically to reduce the interference level in the network. This automatic power adjustment (APA) feature preferably operates across a set of access points, each of which has the function. In this manner, the transmitting power of the neighboring access points in the wireless network is "cooperatively" adjusted to minimize the channel interference and maximize the coverage and throughput for the network.

More specifically, when ACS is enabled within a given access point, preferably at boot-up time the access point scans all the frequencies for all neighboring access points and their signal strengths. The access point preferably also searches for radar signals, as such signals are also an interference source for which the access point must account. A preferred automatic channel selection algorithm according to the invention uses a given channel cost function $C(f)$ that is designed to calculate how much interference results at each frequency. A channel with the least cost of interference is selected for operation. More specifically, the access point preferably goes through the following steps to determine the best channel to select. Initially, the access point searches through all available channels in a given regulatory domain. For each channel, the access point then calculates the related interference cost function $C(f)$, where f is the center frequency of the channel. For its operation, the access point then switches itself to the channel with a minimal cost function $C(f)$. Preferably, the channel cost function is a function that measures the relative amount of unwanted RF signal at a given frequency $(f)$ because of all the access points operating nearby. Given a channel frequency f, preferably the cost function $C(f)$ is derived as a sum of all unwanted RF signals that "leak" into the channel $f$ from all other channels where there are access points operating (including access point(s) operating in channel $f$ itself). The amount of RF signal leakage from access points operating on a given channel k is proportional to the access point's transmitting power on k (represented by a function P(k) that is attenuated by a transmit mask function S(f) evaluated at a frequency displacement). By summing over the leakages from all the channels, the equation of the C(f) channel cost function is derived.

When the above-described automatic channel selection algorithm is used, preferably every neighboring access point has its own channel, and the co-channel interference levels should be low enough so that there is a maximum coverage and high throughput for the network. If these characteristics still cannot be achieved, according to another feature of the invention, the access point may then adjust its power automatically to reduce the interference level in the network. As noted above, this automatic power adjustment feature preferably operates across a set of access points, each of which has the function. The transmitting power of the neighboring access points in the wireless network is "cooperatively" adjusted to minimize the channel interference and maximize the coverage and throughput for the network. The APA function assumes that all or substantially all of the access points are ready to adjust their power output for the benefit of the overall network. The APA function is implemented by and among the access points, but preferably a given access point performs the function autonomously.

A main purpose of the APA algorithm is to lower an access point's transmit power sufficiently so that a neighbor cannot detect the access point's signal strength over a given minimum "noise" threshold. For descriptive purposes, the threshold is referred to as APA_NOISE_THRESHOLD. If it is further assumed that the AP has a set of transmit levels (e.g., LOW, MEDIUM, and HIGH, although any convenient number of levels may be used), then the APA algorithm operates as follows. At boot-up time, the access point runs the ACS algorithm to pick the best channel and switches to that channel, as described above. The access point preferably starts with LOW transmit power on this channel. After a given APA_TIMEOUT period, the access point re-calculates the cost function to determine the level of signal interference on each channel. If the channel interference is less than APA_NOISE_THRESHOLD, then the access point selectively increases the transmit power, e.g., to a next power level. If the channel interference is not less than APA_NOISE_THRESHOLD, the access point decreases the transmit power to a next lower power level. After the APA_TIMEOUT period expires again, the re-calculation and adjustment steps are repeated.

According to another feature of the present invention, a best access point arrangement can be determined given a floor plan and a client distribution. Then, each access point (so located) can then automatically choose the best channel and transmit power settings to maximize the coverage and network throughput. Preferably, the best access point arrangement is achieved by placing the various access points at locations in which the average signals to noise ratio is greatest. According to the invention, this problem is modeled as a three-dimensional (3-D) space partitioning problem that seeks to minimize an average distance between wireless users and the various access points. In a representative embodiment, an initial random set of locations for the access points is selected. Then, the routine attempts to find a new set of locations for the access points where there is an improvement in the average distance between the users and the access points. The process is iterated as many times as needed until there is negligible amount of improvement in an average distance between the users and the access points. Once the access point arrangement is found, the above-described automatic channel selection and automatic power adjustment algorithms are run periodically to optimize the operating channels and transmit power.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 7 illustrates values of the cost function evaluated at the center frequencies of all the channels in the first example;

FIG. 10 illustrates values of the cost function evaluated at the center frequencies of all the channels in the second example;

FIG. 13 illustrates values of the cost function evaluated at the center frequencies of all the channels in the third example;

DETAILED DESCRIPTION OF AN ILLUSTRATIVE EMBODIMENT

Figure 1:
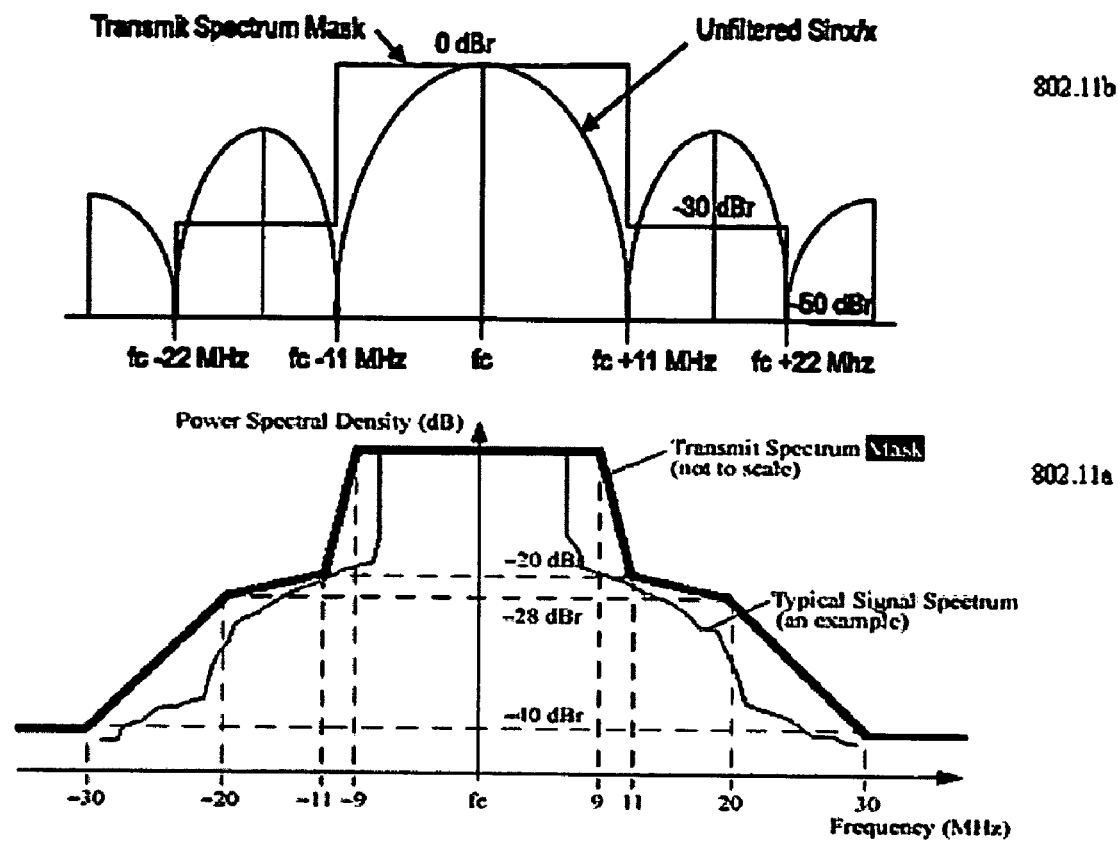
FIG. 1 illustrates a representative transmit spectrum mask for 802.11a and 802.11b.
Figure 2:
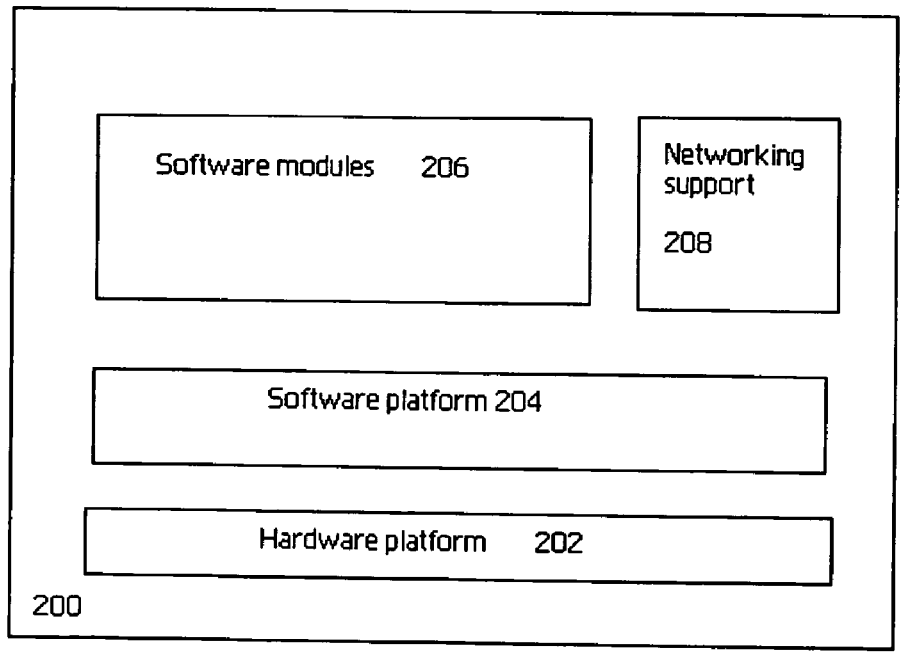
FIG. 2 illustrates a representative access point (AP) device in which the present invention may be implemented.

By way of additional background, FIG. 2 illustrates a representative access point 200 (AP) in which the present invention may be implemented. As is well-known, an access point is a device that includes various software modules 206 executing on a hardware 202 and software platform 204, and suitable networking support 208. A representative access device may have native support for one or more of the following networking options: 802.1d compliant bridging, GRE (RFC 2784), DHCP Server (RFC 2131), DHCP Client, DHCP Relay, DHCP Option 82 (RFC 3046), PPPoE Client (RFC 2516), DNS Relay, Static IP routing, Network Address Translation (RFC 1631), one-to-one NAT for VPN support, RIP v1 (RFC 1058) and v2 (RFC 1723), SMTP (email) redirection, ICMP (RFC 792), ARP (RFC 826) and CIDR (RFC 1519). The device may also include suitable network management support software, such as: SNMP v1 and v2, MIB-II with TRAPS, MIB for user session control, RADIUS Authentication MIB (RFC 2618), RIP v2 extension MIB (RFC 1724), secure access (SSL and VPN) to an embedded HTML management tool, and real-time status, information and protocol traces (Layer 2 and Layer 3). The software may provide one or more access controller functions such as: secure HTML login page, support for centralized WEB portal, Web proxy server, fixed-IP address spoofing, support for 802.1x using EAP-SIM, EAP-TLS, EAP-TTLS and PEAP, MAC-level authentication for non-HTTP or 802.1x devices, RADIUS AAA using EAP-MD5 PAP, CHAP, MSCHAP v2, accounting based on session duration and/or data volume, support for pre-paid subscription, per-user customized firewall, Layer 2 wireless isolation, and support for concurrent authenticated users.

Automatic Channel Selection

One or more access points are presumed to be located within a given regulatory domain. Automatic channel selection (ACS) according to the present invention is a process by which an access point determines a best channel available, i.e., the channel with a least amount of interference. Preferably, ACS is implemented in the access point as software, i.e., a set of computer program instructions executable in a processor. When ACS is enabled within a given access point, preferably at boot-up time the access point scans all the frequencies for all neighboring access points and their signal strengths. The access point preferably also searches for radar signals, as such signals are also an interference source for which the access point must account. Based on this data, the access point then determines which frequency is least likely to be interfered with by these other access points and radar sources. The access point switches itself to this frequency and begins operation. During normal operation, the access point may periodically rescan the air space and reevaluate its current operating channel. If a better channel is found, then the access point switches to the new channel.

Figures 3, 4:
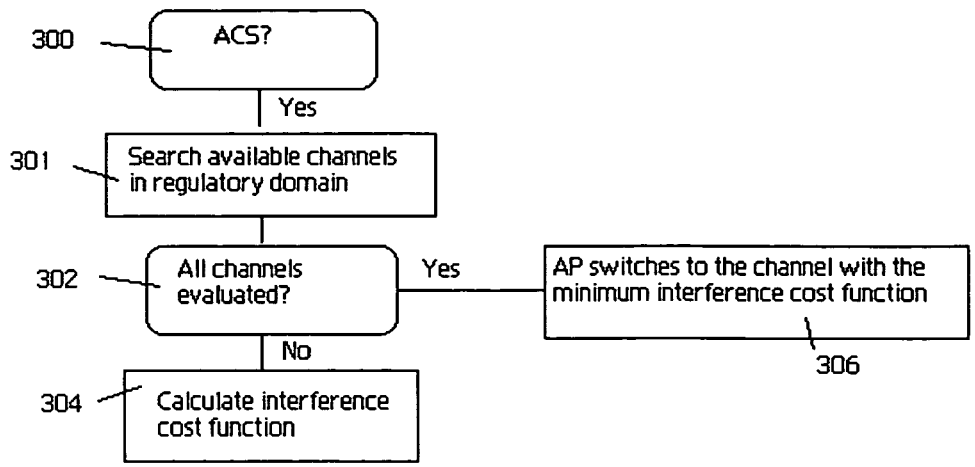
FIG. 3 illustrates a process flow diagram for the automatic channel selection (ACS) algorithm in a representative embodiment.
FIG. 4 illustrates a look-up table to facilitate computation of a S(f) function that is used in the ACS algorithm of FIG. 3.

A preferred 802.11b ACS operating routine is illustrated by the flowchart in FIG. 3 for a given access point. It is assumed that one or more other access points in the domain have a similar functionality. At step 300, a test is made to determine whether the ACS function is to be performed. As noted above, preferably the ACS function is carried out at boot-up as well as periodically thereafter. If the outcome of the test at step 300 is positive, the access point will then begin ACS at step 301 by searching through all available channels in the given regulatory domain. Then, at step 302, a test is performed to determine whether all channels have been evaluated. If not, the routine continues at step 304. At this step, the access point calculates the interference cost function $C(f)$, where f is the center frequency of the channel. Preferably, the channel cost function is a function that measures the relative amount of unwanted RF signal at a given frequency ($f$) because of all the access points operating nearby. Given a channel frequency f, preferably the cost function $C(f)$ is derived as a sum of all unwanted RF signals that "leak" into the channel f from all other channels where there are access points operating (including access point(s) operating in channel $f$ itself). The amount of RF signal leakage from access points operating on a given channel k is proportional to the access point's transmitting power on k (represented by a function $P(k)$ that is attenuated by a transmit mask function $S(f)$ evaluated at a frequency displacement). By summing over the leakages from all the channels, the equation of the $C(f)$ channel cost function is derived at step 304. It is not required to sum the leakages from all of the channels, as a subset may be used. The routine then cycles back to step 302. When the outcome of the test at step 302 is positive, the access point then switches itself to the channel with a minimal cost function $C(f)$. This is step 306 to complete the ACS process.

Thus, according to the invention, the preferred automatic channel selection algorithm uses the channel cost function $C(f)$ to calculate how much interference results at each frequency. A channel with the least cost of interference then is selected for operation.

In 802.11b, it is assumed that no radar signal is present. Instead, as noted above, there will be co-channel interferences, because all of the access points may not be placed sufficiently far apart. In particular, access points may operate on other channels including channels 1, 6 and 11. To solve this problem, according to the inventive algorithm, the cost function $C(f)$ is introduced to calculate how much interference results at each frequency. Then, the channel with the least cost or interference is selected for operation.

A representative cost function is defined by Equation 1 below:

Equation 1: Definition of the Channel Interference Cost Function $$C(f) = \sum_{k=1}^{13} |P(k)S(f - 5*(k-1) - 2412)|, \quad f = 2412, 2417, \ldots, 2472$$

where:

$P(k)$ = Cumulative signal strength of all APs at channel $k$ $S(f)$ = Spectrum of transmitted signal (i.e., sine function multiplied by transmit spectral mask)

$$S(f) = \text{Sinc}(\frac{\pi f}{11})((\mu(f+11) - \mu(f-11)) + \frac{1}{1000}(\mu(f+22) - \mu(f-22)) + \frac{1}{100000}(\mu(f-22) + \mu(22-f))$$

$\mu(f)$ = unit_function

In a representative, but non-limiting embodiment, the $C(f)$ function is only evaluated at discrete frequencies that represent 14 b/g channels; thus, in such case the computation of this function can be simplified using a look-up table of the $S(f)$ function. A representative look-up table for this function is shown in FIG. 4. As can be seen from equation 1 above, the cost function preferably is computed from $P(k)$ and $S(f)$, where $P(k)$ is the access point's cumulative signal strength measured at each channel (e.g., 1 to 13) and $S(f)$ is the spectrum of the filtered transmitted signal. The table shown in FIG. 4 represents the S(f–5*k) function sampled at every 5 MHz interval from the center frequency.

Figure 5:
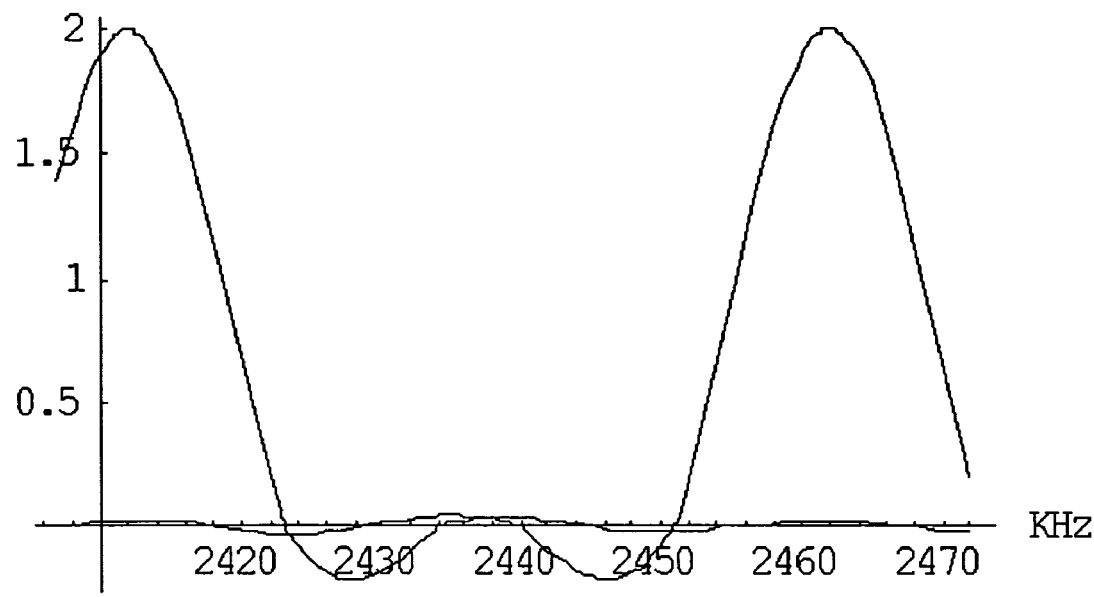
FIGS. 5-6 illustrate transmit channels and the associated cost function for those channels in a first example.
Figure 6:
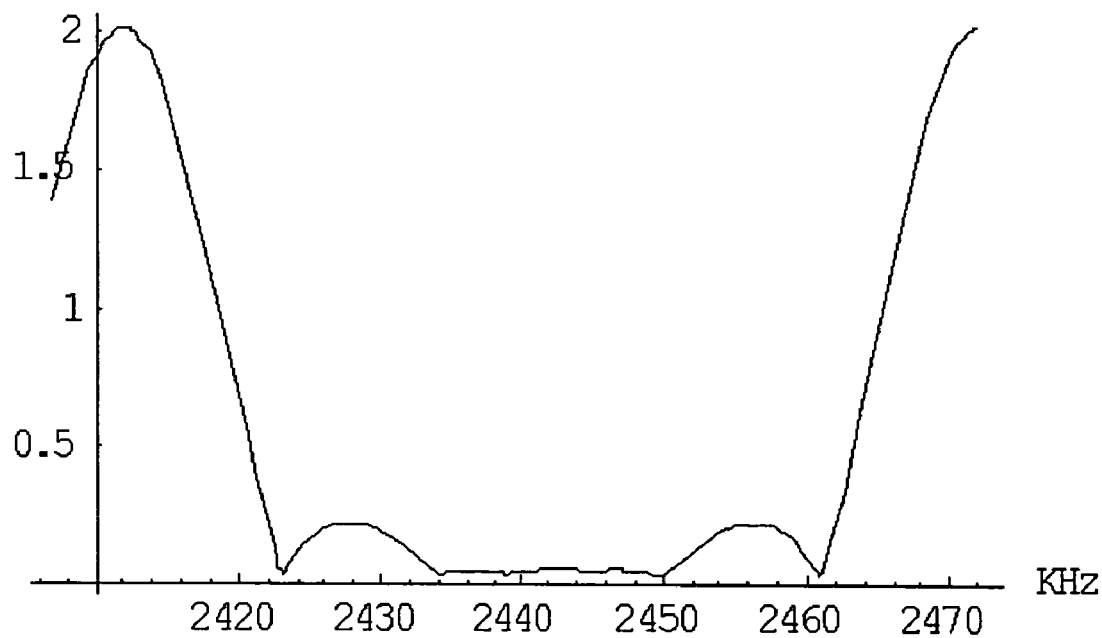

FIG. 5 shows a first example where channel 1 (2.412 GHz) and channel 11 (2.467 GHz) are busy transmitting. In this example, FIG. 6 shows the cost function calculated from interference imposed by activities on channel 1 and channel 11. In this example, the values of the cost function evaluated at the center frequencies of all the channels are as set forth below in Table 1 shown in FIG. 7.

Figure 8:
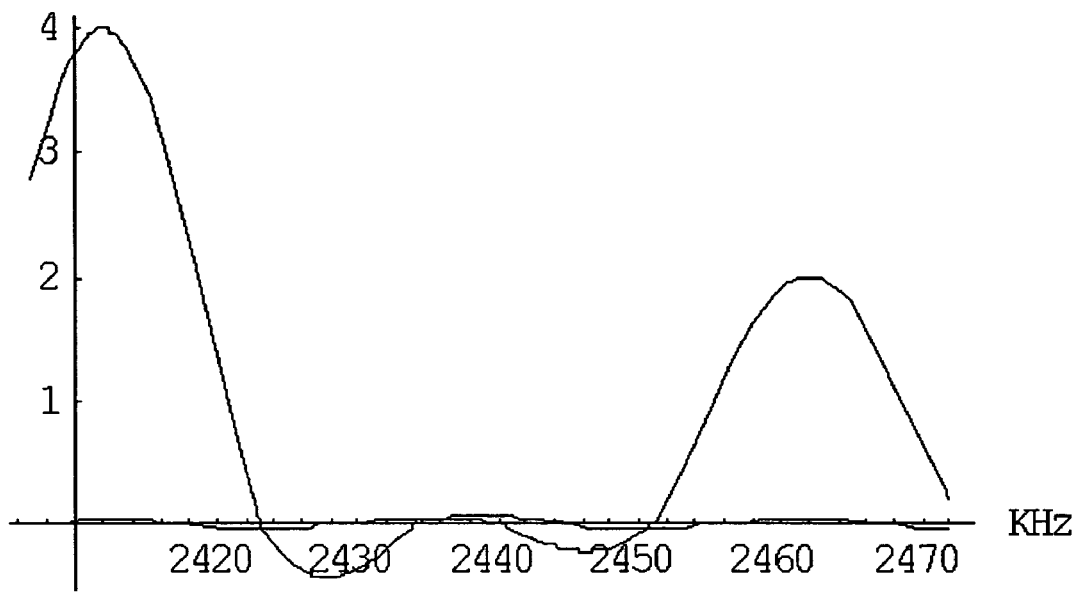
FIGS. 8-9 illustrate transmit channels and the associated cost function for those channels in a second example.
Figure 9:
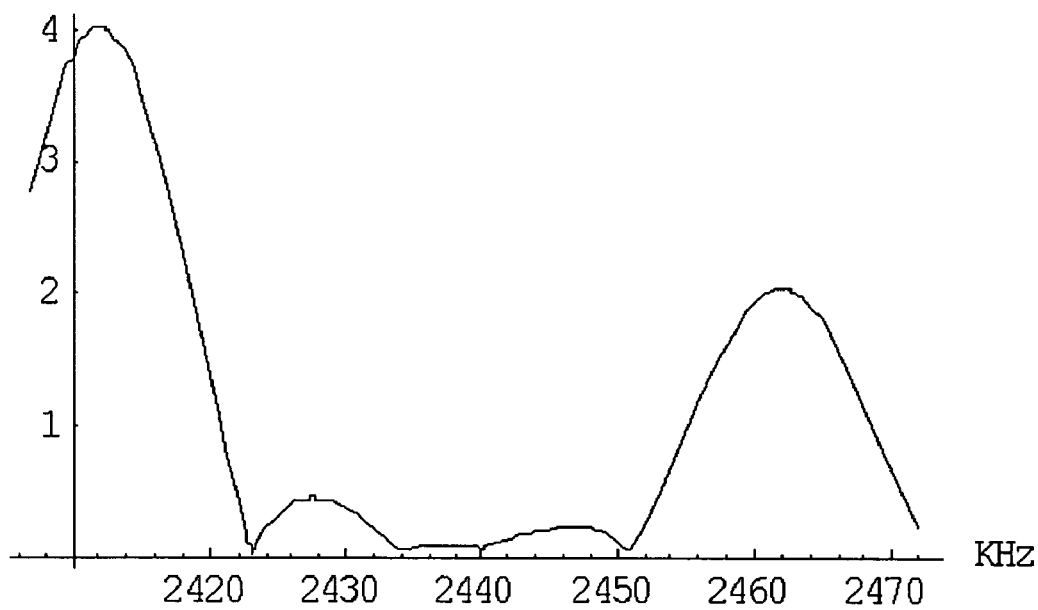

FIG. 8 shows a second example, where channel 1 (2.412 GHz) and channel 11 (2.467 GHz) are busy transmitting. Here, the cumulative signal strength $P(k)$ for channel 1 is assumed to be twice as strong as that of channel 11. FIG. 9 shows the cost function calculated from interference imposed by activities on channel 1 and channel 11. In this second example, the values of the cost function evaluated at the center frequencies of all the channels are set forth below in Table 2 shown in FIG. 10. As can be seen, Table 2 shows that the best channel to use is again Channel 6. This is an interesting result, because it indicates that when the access points are operated sufficiently far apart (channel 1 and channel 11), then their effect on the selection of the best channel is very limited, regardless of the signal strength.

Figure 11:
FIGS. 11-12 illustrate transmit channels and the associated cost function for those channels in a third example.
Figure 12:
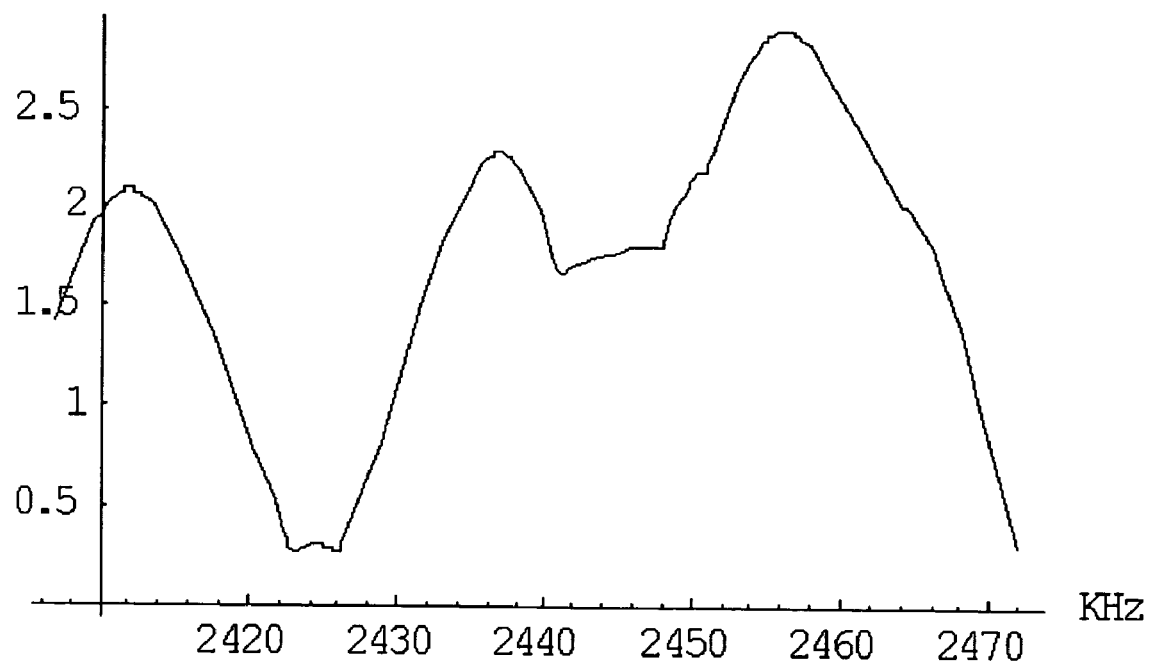

A more complex example is where there are access points operating on channel 1 (2.412 GHz), channel 6 (2.437 GHz), channel 9 (2.452 GHz) and channel 11 (2.462 GHz). FIG. 11 shows the transmit signal spectrum for access points operating on channel 1, 6, 9 and 11. FIG. 12 shows a cost function calculated from interference imposed by activities on these channels. In this third example, the values of the cost function evaluated at the center frequencies of all the channels are set forth in Table 3 shown in FIG. 13. Table 3 shows two possible channels to use, namely, channels 4 and 13. Both channels have the same minimum cost of 0.054403. In such case, the selection may be refined, e.g., by comparing a number of neighboring access points for each of the two channels. In such case, the channel with a least number of neighboring access points can be used. If this comparison fails to produce a definitive result, then a channel can be chosen randomly between the two candidates.

Figure 14:
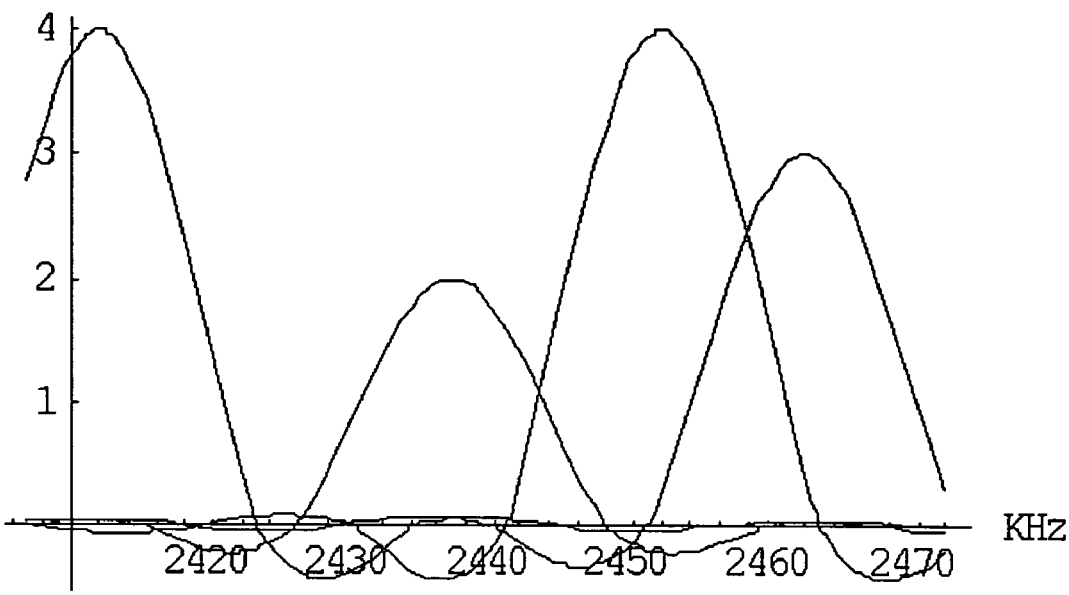
FIGS. 14-15 illustrate transmit channels and the associated cost function for those channels in a fourth example.
Figure 15:
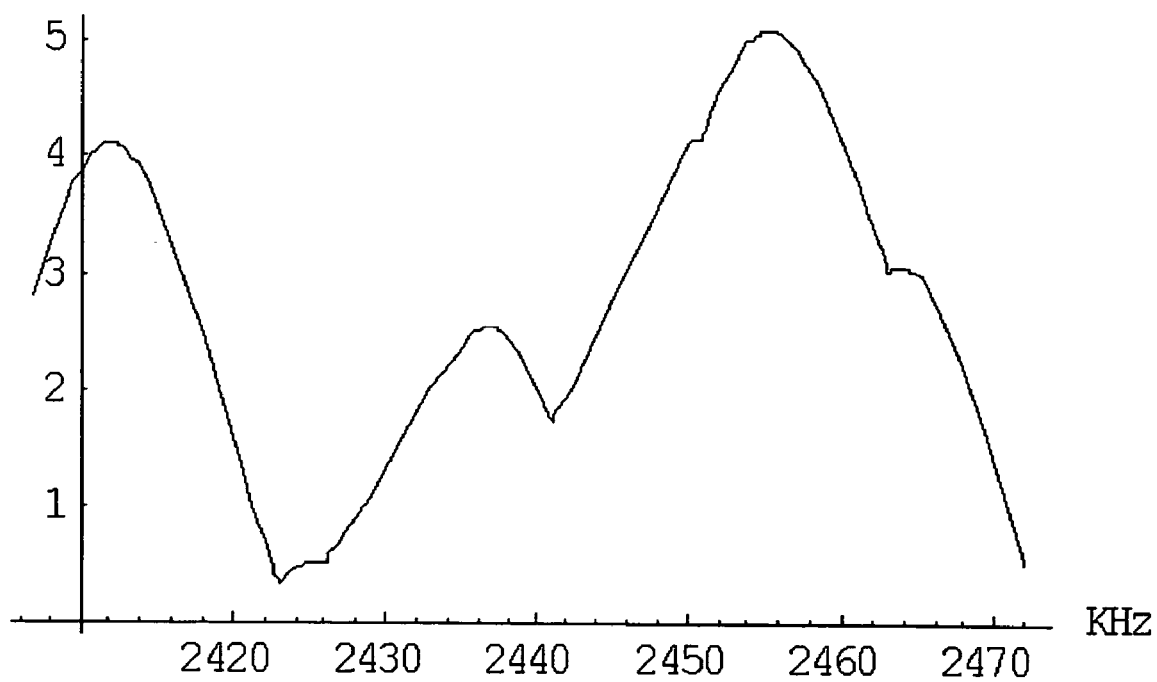

A still more complex example is where the access points are operating on the same four channels of the previous example (channel 1 (2.412 GHz), channel 6 (2.437 GHz), channel 9 (2.452 GHz) and channel 11 (2.462 GHz)) but where the signal strengths of these channels are assumed to be (as shown in FIG. 14): $P(1)=2$, $P(6)=1$, $P(9)=2$, $P(11)=1.5$. FIG. 15 shows the cost function calculated from interference imposed by activities on channel 1, 6, 9 and channel 11. In this fourth example, the values of the cost function evaluated at the center frequencies of all the channels are set forth in Table 4 shown in FIG. 16.

The above examples, of course, are merely exemplary of the basic ACS algorithm. One of ordinary skill will appreciate that the inventive automatic channel algorithm is not dependent on any particular operating assumptions, e.g., such as that all access points belong to channels 1, 6 and 11 when used for 802.11b/g. Rather, the algorithm takes into account that all channels are likely to be used by neighboring access points.

Factors that may affect the cost function are the relative locations of the access points, obstructions (walls, cabinets and the like) in the environment, and a given access point's operating channel and transmit power. One or more of these factors may change over time. For example, an access point may be moved, a new access point may be installed, an old access point is removed, a wall is raised, and so on. All or some of these changes may have an impact on the cost function that ultimately determines the best channel or the best transmit power to use. To track these changes, preferably the ACS algorithm should run periodically (e.g., every 24 hours) to readjust the access point to fit its new operating environment.

The following provides additional details regarding automatic channel selection algorithm for 802.11a. Initially, the access point searches through all available channels in the given regulatory domain as has been described. If there is a radar free channel and no other access point is present, then the radar free channel is used and the search stops. If, however, there are multiple radar free channels, the algorithm selects the channel with the minimum cumulative signal strength and the search stops. If there is no radar free channel available, the access point is set in a monitor mode and periodically checks for an available channel.

Automatic Power Adjustment

Another consideration in switching to a best channel is that the access point should not switch to a new channel until there is a significant improvement in the interference on the new channel. Otherwise, there would be channel switching every time there is a slightest change in the interference level. According to another feature of the inventive algorithm, preferably a given switching threshold may be defined. The access point is then restricted from switching to a new channel when the interference improvement is less than the switching threshold. In an illustrative embodiment, the switching threshold (which is configurable) is 1 dBm, although this is not meant to be limiting. Any suitable switching threshold may be used.

When the automatic channel selection algorithm is used, as noted above preferably every neighboring access point should have its own channel, and the co-channel interference levels should be low enough so that there is a maximum coverage and high throughput for the network. If these characteristics still cannot be achieved, the access point may then have to adjust its power to reduce the interference level in the network. The present invention provides this function, as will now be described.

According to the invention, automatic power adjustment (APA) on a channel is the ability to cooperatively adjust the transmitting power by all the neighboring access points in a wireless network to minimize the channel interference and maximize the coverage and throughput for the network. The APA function assumes that all or substantially all of the access points are ready to adjust their power output for the benefit of the overall network. Thus, it may be assumed that each access point has the APA functionality.

Figures 16, 17:
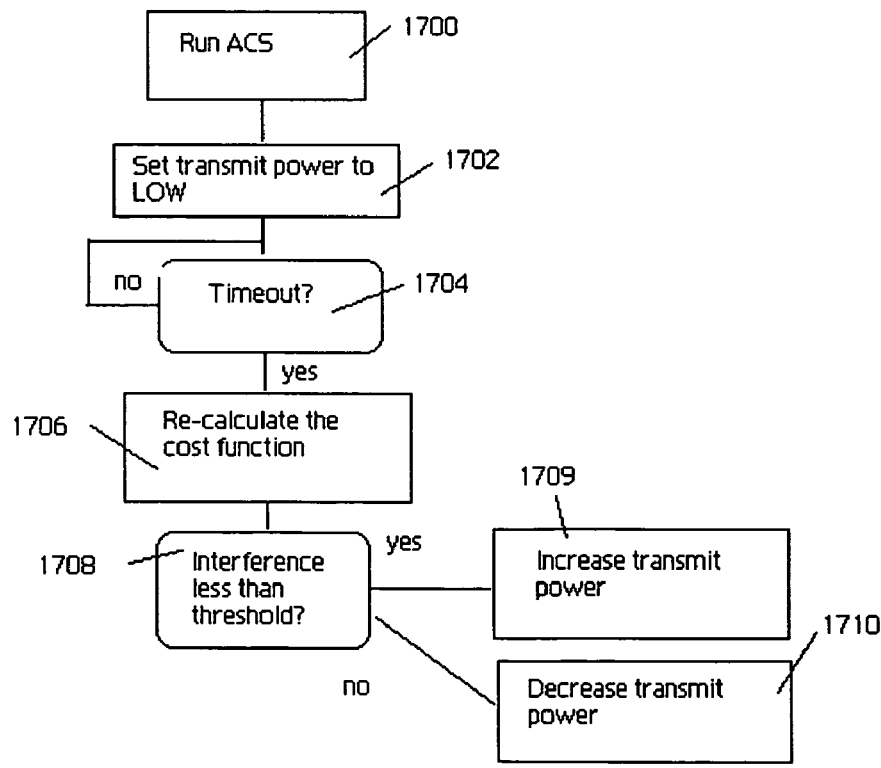
FIG. 16 illustrates values of the cost function evaluated at the center frequencies of all the channels in the fourth example.
FIG. 17 illustrates a process flow diagram for an automatic power adjustment (APA) algorithm according to the present invention.

A main purpose of the APA algorithm is to lower an access point's transmit power sufficiently so that its neighbor cannot detect the access point's signal strength over a given minimum "noise" threshold. Each access point operates autonomously, i.e., independently, of any other access point. Thus, a particular access point may perform that ACS and/or APA algorithm at any given time, irrespective of when another access point performs such functions. For descriptive purposes, the threshold is referred to as APA_NOISE_THRESHOLD. In an illustrative embodiment, it is assumed that APA_NOISE_THESHOLD is defined to be −80 dBm. This is not a limitation of the invention, however. If it is further assumed that the AP has a set of transmit levels (e.g., LOW, MEDIUM, and HIGH, although any convenient number of levels may be used), then the APA algorithm operates as follows and as illustrated in the flowchart of FIG. 17. At boot-up time, the access point runs the ACS algorithm to pick the best channel and switches to that channel, as described above. This is step 1700. At step 1702, the access point starts with LOW transmit power on this channel. A test is run at step 1704 to determine whether a given timeout period has occurred. If not, the routine cycles. After a given APA_TIMEOUT period, the access point re-calculates the cost function to determine the level of signal interference on each channel. This is step 1706. A test is then made at step 1708 to determine if the channel interference (for the currently selected channel on which the AP is operating) is less than APA_NOISE_THRESHOLD. If so, the routine branches to step 1709, at which step the access point selectively increases the transmit power, e.g., to a next power level. If the outcome of the test at step 1708 indicates that the channel interference is not less than APA_NOISE_THRESHOLD, however, the routine branches to step 1710, at which step the access point decreases the transmit power, e.g., to a next lower power level. After the APA_TIMEOUT period expires again, the re-calculation and adjustment steps are repeated.

The APA algorithm is advantageous, especially as applied by multiple access points. By executing the algorithm in this manner, the transmit power of a given access point is modified dynamically so that the signal interference from a neighboring access point will not be higher than a perceived (adjustable) noise level. As can be seen, preferably access points execute the APA algorithm autonomously, with the result being that a set of such devices, collectively, provides improved network performance. Preferably, as for the reasons described above, the APA algorithm should run periodically (e.g., every 24 hours) to readjust the access point's transmitting power to fit any changes in the operating environment.

As noted above, preferably each access point operates autonomously, i.e., independently, of any other access point. Thus, a particular access point may perform the ACS and/or APA algorithm (as the case may be) at any given time, irrespective of when another access point performs one or more of such functions.

Access Point Location Determination

The above-described techniques can be optimized to further enhance the performance of the wireless network. In particular, the APA algorithm as described above does not have knowledge of various environmental characteristics in the domain, such as the client distribution, floor planning, and the arrangement of the access points. According to another aspect of the present invention, it is possible to optimize the access point arrangement for maximum coverage and throughput of the given network if this information were available or otherwise discoverable. For the following discussion, it is assumed there is a central platform or other central server controller that can collect information from all the access points in the network. Further, let:

S be the 3D space provided by the floor planning, $S \in \Re^3$ $s_1, s_2, \ldots, s_M$ be the client distribution, $s_i \in S$ $a_1, a_2, \ldots, a_N$ be the access point arrangement, $a_i \in S$.

With the above assumptions, in this embodiment, preferably there are several goals of the APA algorithm: (a) to find the best access point arrangement given the floor planning S and the client distribution, and (b) to automatically choose the best channel and transmit power settings to maximize the coverage and network throughput. One technique to determine the client distribution is for the access points (or some of them) to monitor for client signal strength and feed such information back to a central service controller. Using such information, the service controller then triangulates all the client information provided by the access points and determines the number of clients M and their respective locations. In one embodiment, a best distribution of access points means that an expected distance between a set of clients and a set of access points is minimal. In particular, because the signal-to-noise ratio is inversely proportional to the distance between the client and the access point, minimizing this distance directly maximizes the signal-to-noise ratio.

The following computer-implemented procedure may be used to find an optimal access point arrangement $a_1, a_2, \ldots, a_N$:

1. Let $a_1, a_2, \ldots, a_N$ be randomly chosen within space S
2. Given $A_m = \{a_1, a_2, \ldots, a_N\}$, find a minimum distortion partition $\wp(A_m) = \{S_i | i=1, \ldots, N\}$ of a client distribution $s_j \in S_i$ if $d(s_j, a_i) \leq d(s_j, a_k)$ for all k. Compute an average distortion as follows:

$$D_m = D(\{A_m, \wp(A_m)\}) = \frac{1}{I} \sum_{i=0}^{I-1} \min_{a \in A_m} d(s_i, a)$$

3. If $(D_{m-1} - D_m)/D_m \leq \epsilon$ then stop the iteration, wherein the final AP arrangement is $A_m$; otherwise continue.
4. Find an optimal set of representative centroids $A_{m+1} = \{a(S_i) | i=1, \ldots, N\}$ for $\wp(A_m)$ where $$a(S_i) = \frac{1}{|S_i|} \sum_{j: s_j \in S_i}^{|S_i|} s_j$$

replace m by m+1 and go to step 2.

The following provides additional details regarding the algorithm set forth above. It is assumed that steps (1)-(3) of the algorithm are executed against a client distribution that is static. As noted above, preferably, the location of the clients in the distribution is determined by a controller using, e.g., a triangulation or other known technique. Given this static client distribution, a "partition" typically is a portion of the overall space, and preferably there is one partition associated with a given access point. Step (2) above generates a partition by determining a set of clients (of the static distribution) that are best associated with the given access point. This set of clients (i.e., the clients for which a given access point is best, in terms of highest signal-to-noise ratio, or other given performance metric) is then said to be associated with the partition. The identity of the particular access point to which a particular static client is best associated typically will depend on the distance between the client and the given access point location (as initially set in step (1), as possibly modified in step (4)). A first access point $a_i$ thus will have an associated partition with clients $s_j$. Once the partitions are determined in step (2), a distortion distribution is calculated for each partition, and then an average distortion $D_m$ is calculated over all the partitions. In step (3), the relation $(D_{m-1} - D_m)/D_m \leq \epsilon$ tests whether a distortion for a last iteration $(D_{m-1})$ shows a significant enough improvement over a current iteration $(D_m)$. The value of epsilon is a small constant that is configurable, e.g., $10^{-3}, 10^{-4}, 10^{-5}$, or the like. If the configured value is met or exceeded, the routine stops at step (3); if not, the routine uses step (4), in effect, to select a new set of AP locations. Preferably, a center of a partition is a centroid. With the new AP locations, the routine returns to step (2) and re-cycles until the improvement of the current iteration is below the configured threshold, which indicates that no further improvement in the location set can be obtained. If desired, the controller may generate a new client distribution before performing step (2) during a next iteration of the algorithm, although this is not a requirement.

Generalizing, according to this aspect of the present invention, the optimal location(s) to place the access points are the locations in which the average signal to noise ratio is greatest. The problem is analogous to that of minimizing an average distance between the users and the access points. This is because, as a given user is closer to a given access point, his or her reception and throughput would also become better. As illustrated above, the problem of minimizing the average distance between a user distribution and the access points preferably is modeled and solved as a 3D space partitioning problem. According to the invention, routine for determining optimal access point locations starts with an initial random set of locations for the access points. Then, the routine tries to find a new set of locations for the access points where there is an improvement in the average distance between the users and the access points. This process is repeated as many times as needed, e.g., until there is a negligible amount of improvement (represented in the formula above by $(D_{m-1} - D_m)/D_m \leq \epsilon$) in the average distance between the users and the access points.

The above-described technique is useful to determine optimal access point locations given a floor plan and an approximate distribution of the wireless users. Once the access point arrangement is found, the above-described automatic channel selection and automatic power adjustment algorithms are run periodically to optimize the operating channels and the transmit power.

An initial set of access point locations can be entered into the access point location algorithm manually, or discovered as necessary. The initial set may also simply be a random set of access point locations.

In an alternative embodiment, the following mean square error (MSE) function can be chosen for the distortion function $D_m$:

$$d(x, y) = \frac{1}{k}\sum_{i=1}^{k}(x_i - y_i)^2 \text{ where } k = 3 \text{ for the } 3D \text{ real space.}$$

In another alternative embodiment, the distortion function can be any other distortion or error measuring function (e.g., an absolute value of $x_i - y_i$, or the like).

The present invention is quite advantageous. As has been described, the automatic channel selection for 802.11a is straightforward because there is little co-channel interference. ACS for 802.11b/g is more involved because the calculation involves optimizing a non-linear cost function. The cost function may have several local minima. In the above examples, however, the cost function works well in determining the best channel to use. In practice, other information may be used to complement the cost function and enhance the channel selection process. As one variation, channel distance information and/or information about a local minimum and its adjacent busy channel can be used to further refine the channel selection.

While aspects of the present invention have been described in the context of a method or process, the present invention also relates to apparatus for performing the operations herein. As has been described above, this apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs on a server on a standard Intel hardware platform running an operating system such as Linux.

While given components of the system have been described separately, one of ordinary skill will appreciate that some of the functions may be combined or shared in given instructions, program sequences, code portions, and the like.

Finally, while the above text describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Having described my invention, what I now claim is as follows:

1. A method operative within a wireless network having at least first and second access points operating in proximity to one another within a given area, comprising:
   having each of the first and second access points select and switch to a given radio channel autonomously; and
   having each of the first and second access points adjust its transmit power to a given value autonomously;
   wherein the given value of the first access point is a signal strength below a given minimum noise threshold detectable by the second access point, and the given value of the second access point is a signal strength below a given minimum noise threshold detectable by the first access point;
   wherein each of the first and second access points selects a given radio channel by calculating a cost function that represents a cumulative signal strength generated by relative radio frequency activity levels at a given frequency due to other access points and other RF sources operating within the given area, the cost function being independent of transmission medium activity.

2. The method as described in claim 1 further including the step of having at least one of the first and second access points re-adjust its transmit power periodically.

3. The method as described in claim 2 wherein the transmit power is re-adjusted to a higher transmit power.

4. The method as described in claim 2 wherein the transmit power is re-adjusted to a lower transmit power.

5. The method as described in claim 1 wherein each of the first and second access point selects a given radio channel at boot-up.

6. A method operative within a wireless network having a plurality of access points operating in proximity to one another within a given area, comprising:
   having each of the plurality of access points select and switch to a given radio channel autonomously, wherein each of the plurality of access points then operates on a given radio channel uniquely; and
   having each of the plurality of access points adjust its transmit power to a given value autonomously to minimize radio channel interference collectively across the plurality of access points;
   wherein each of the plurality of access points selects a given radio channel by calculating a cost function that represents a cumulative signal strength generated by relative radio frequency activity levels at a given frequency due to other access points and other RF sources operating within the given area, the cost function being independent of transmission medium activity.

7. The method as described in claim 6 wherein the plurality of access points includes at least first and second access points, and wherein the first access point adjusts itself to have a signal strength below a given minimum noise threshold detectable by the second access point, and wherein the second access point adjusts itself to have a signal strength below a given minimum noise threshold detectable by the first access point.

8. A method, operative within an access point operating in proximity to one or more other access points within a given area, comprising:
   (a) having the access point select a given radio channel for operation;
   (b) setting a transmit power on the given radio channel to a given first value;

(c) periodically repeating step (a), wherein at each iteration of step (a), the access point tests whether interference on the given radio channel selected has a given relationship to a threshold;
(d) if the interference on the given radio channel selected has a given relationship to the threshold, adjusting the transmit power;
wherein the access point selects the given radio channel by calculating a cost function that represents a cumulative signal strength generated by relative radio frequency activity levels at a given frequency due to the one or more other access points and other RF sources operating within the given area, the cost function being independent of transmission medium activity.

9. The method as described in claim 8 wherein the transmit power is adjusted to a second value that is higher than the given first value.

10. The method as described in claim 8 wherein the transmit power is adjusted to a second value that is lower than the given first value.

* * * * *